United States Patent
Jung et al.

(10) Patent No.: US 11,805,446 B2
(45) Date of Patent: Oct. 31, 2023

(54) CONDITIONAL SUPPLEMENTARY LINK ACTIVATION AND TRANSMISSION

(71) Applicant: LG Electronics Inc., Seoul (KR)

(72) Inventors: Sunghoon Jung, Seoul (KR); Geumsan Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 17/423,981

(22) PCT Filed: Mar. 24, 2020

(86) PCT No.: PCT/KR2020/003989
§ 371 (c)(1),
(2) Date: Jul. 19, 2021

(87) PCT Pub. No.: WO2020/197237
PCT Pub. Date: Oct. 1, 2020

(65) Prior Publication Data
US 2022/0159513 A1    May 19, 2022

Related U.S. Application Data

(60) Provisional application No. 62/823,630, filed on Mar. 25, 2019, provisional application No. 62/823,635, (Continued)

(51) Int. Cl.
*H04W 28/08* (2023.01)
*H04W 76/15* (2018.01)
(Continued)

(52) U.S. Cl.
CPC ........ *H04W 28/0967* (2020.05); *H04L 5/0098* (2013.01); *H04W 28/0236* (2013.01); *H04W 76/15* (2018.02)

(58) Field of Classification Search
CPC ......... H04L 5/001; H04L 5/0098; H04L 1/08; H04W 28/08; H04W 28/0875; H04W 28/0967; H04W 28/10; H04W 76/15
See application file for complete search history.

(56) References Cited

U.S. PATENT DOCUMENTS

2018/0098250 A1* 4/2018 Vrzic ............... H04W 36/0016
2018/0270139 A1* 9/2018 Singh ...................... H04L 45/24
(Continued)

FOREIGN PATENT DOCUMENTS

WO    WO2018204828    11/2018

OTHER PUBLICATIONS

3GPP, "3rd Generation Partnership Project; Technical Specification Group Radio Access Network; NR; NR and NG-RAN Overall Description; Stage 2 (Release 15)," dated Dec. 2018, 97 pages.
(Continued)

*Primary Examiner* — Gary Mui
(74) *Attorney, Agent, or Firm* — Fish & Richardson P.C.

(57) ABSTRACT

A method and apparatus for conditional supplementary link activation and transmission in a wireless communication system is provided. A wireless device configures a primary transmission link and at least one supplementary transmission link. The primary transmission link is activated. The wireless device configures a first condition and a second condition. The wireless device determines that the first condition is met upon which the at least one supplementary transmission link is activated. The wireless device performs transmission by using at least one of activated transmission links based on whether the second condition is met.

14 Claims, 20 Drawing Sheets

Related U.S. Application Data filed on Mar. 25, 2019, provisional application No. 62/823,623, filed on Mar. 25, 2019.

(51) Int. Cl.
*H04L 5/00* (2006.01)
*H04W 28/02* (2009.01)

(56) References Cited

U.S. PATENT DOCUMENTS

| | | | |
|---|---|---|---|
| 2018/0279168 A1 | 9/2018 | Jheng et al. | |
| 2020/0037151 A1* | 1/2020 | Du | H04L 1/08 |
| 2020/0274654 A1* | 8/2020 | Loehr | H04L 1/1887 |
| 2020/0374752 A1* | 11/2020 | Xiao | H04W 76/15 |
| 2021/0297901 A1* | 9/2021 | Tang | H04L 1/188 |
| 2021/0345173 A1* | 11/2021 | Uchino | H04L 1/22 |
| 2022/0014961 A1* | 1/2022 | Baek | H04L 1/1614 |
| 2022/0070696 A1* | 3/2022 | Jung | H04W 24/02 |
| 2022/0095374 A1* | 3/2022 | Wang | H04W 16/14 |

OTHER PUBLICATIONS

CATT, "Considerations on duplication support for IIoT," R2-1816366, Presented at 3GPP TSG-RAN WG2 Meeting #104, Spokane, USA, Nov. 12-16, 2018, 4 pages.

Vivo, "Duplication support in IAB," R2-1816508, Presented at 3GPP TSG-RAN WG2 Meeting #104, Spokane, USA, Nov. 12-16, 2018, 3 pages.

ZTE, "Considerations on PDCP duplication and routing for NR-U," R2-1816840, Presented at 3GPP TSG RAN WG2 Nr #104 Meeting, Spokane, US, Nov. 12-16, 2018, 2 pages.

* cited by examiner

CONDITIONAL SUPPLEMENTARY LINK ACTIVATION AND TRANSMISSION

TECHNICAL FIELD

The present disclosure relates to conditional supplementary link activation and transmission.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In Release 15, the basic support for URLLC was introduced with transmission time interval (TTI) structures for low latency as well as methods for improved reliability. Further use cases with tighter requirements have been identified as an important area for NR evolution. New Release 16 use cases with higher requirements may consider factory automation, transport industry, and/or electrical power distribution. For enhancements of URLLC, data duplication and/or multi-connectivity enhancements may be considered.

SUMMARY

In Rel-15, packet data convergence protocol (PDCP) duplication was introduced for enhancing reliability and/or reducing latency to satisfy the requirement. PDCP duplication has advantage in terms of packet transmission reliability and/or average packet transmission delay. However, there is a trade-off in terms of additional utilization of radio resources and/or power consumption. Therefore, there may be a need to introduce conditional packet duplication.

In an aspect, a method for a wireless device in a wireless communication system is provided. The method includes configuring a primary transmission link and at least one supplementary transmission link. The primary transmission link is activated. The method includes configuring a first condition and a second condition, determining that the first condition is met upon which the at least one supplementary transmission link is activated, and performing transmission by using at least one of activated transmission links based on whether the second condition is met.

In another aspect, an apparatus for implementing the above method is provided.

The present disclosure can have various advantageous effects.

For example, duplicate transmission and/or selective link transmission can be performed conditionally.

For example, only when the UE experiences and/or expects to experience some transmission problem, the supplementary transmission link for duplicate transmission and/or selective link transmission can be activated and/or used.

For example, such conditional duplicate transmission and/or selective link transmission can achieve minimal radio usages and/or minimal transmission delay.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
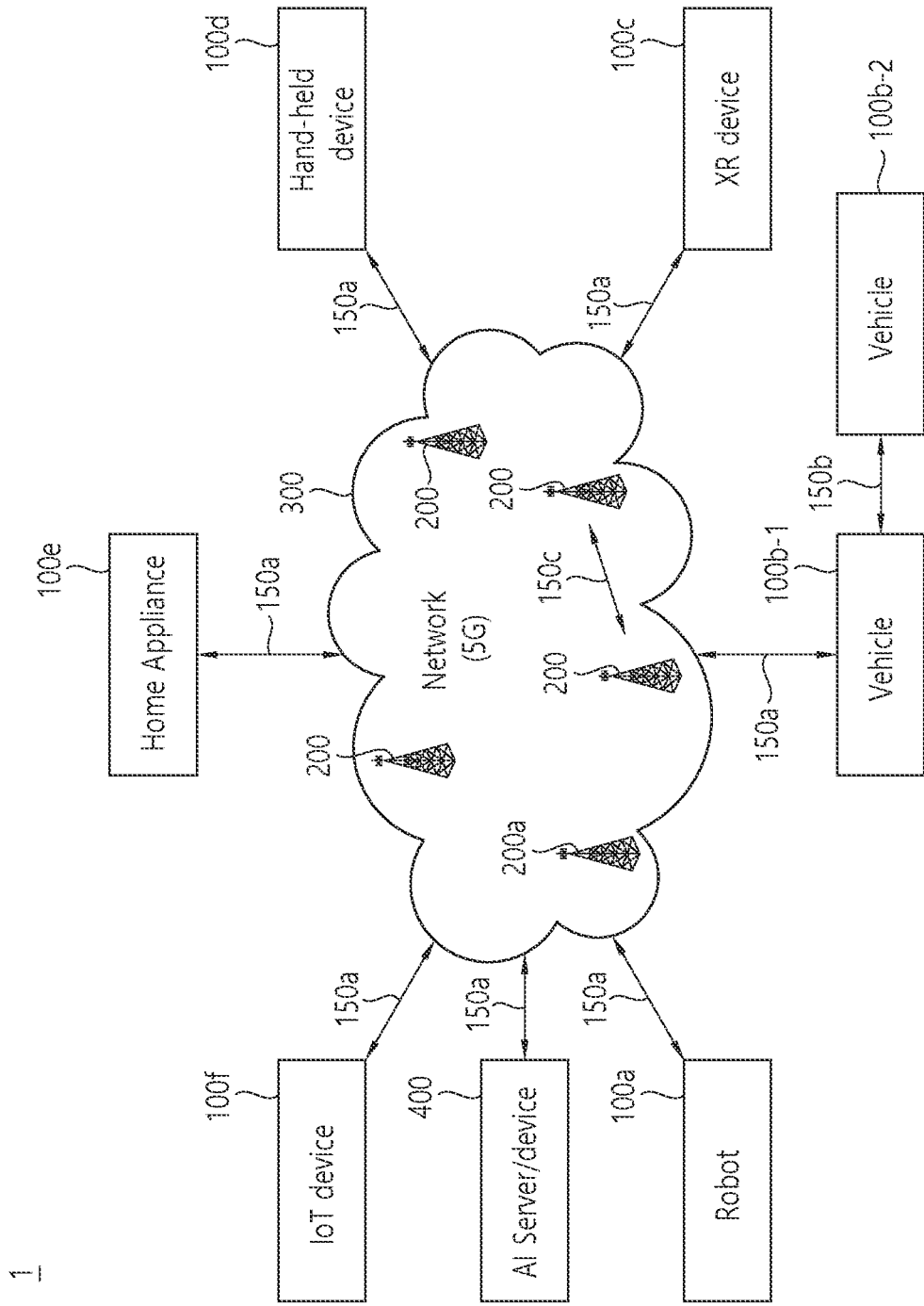
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
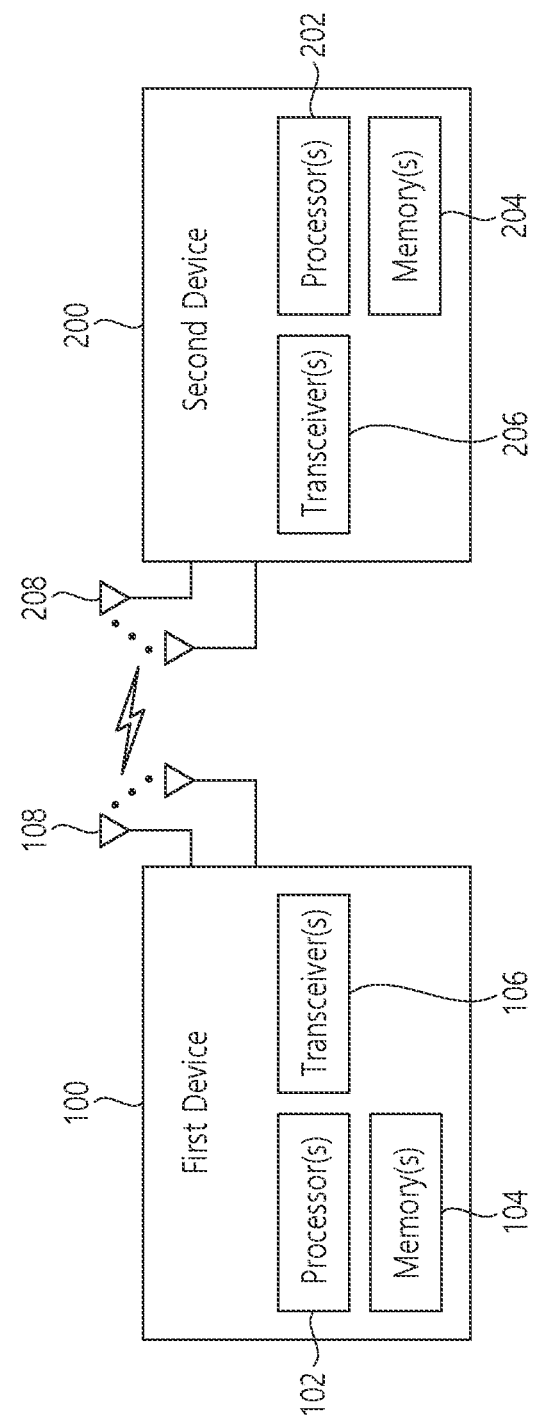
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/ circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
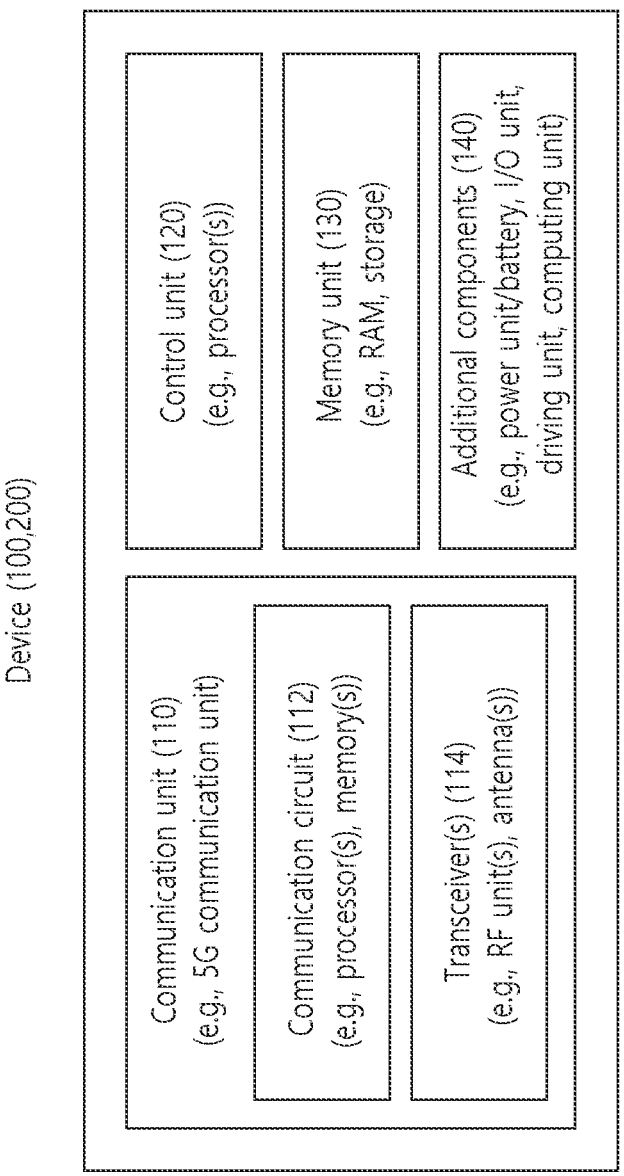
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
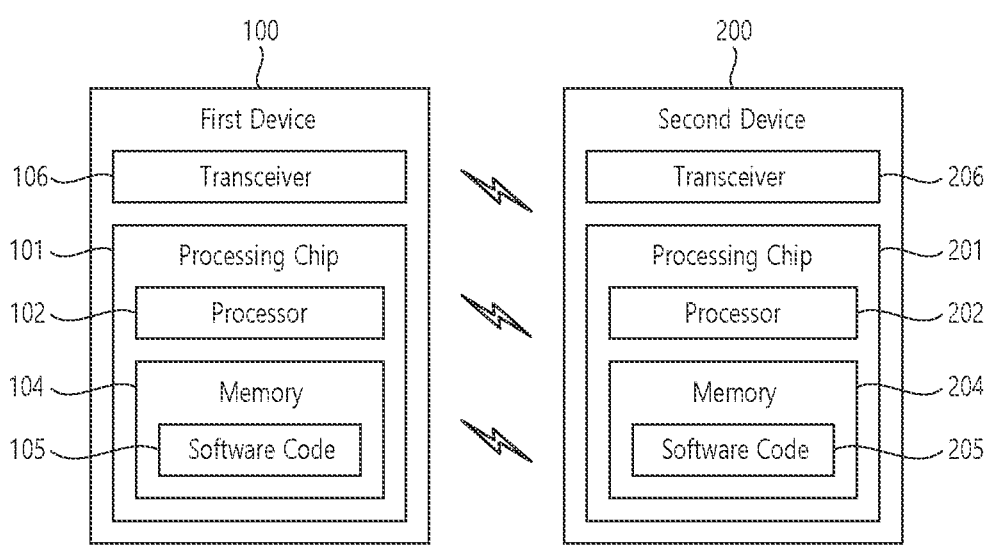
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
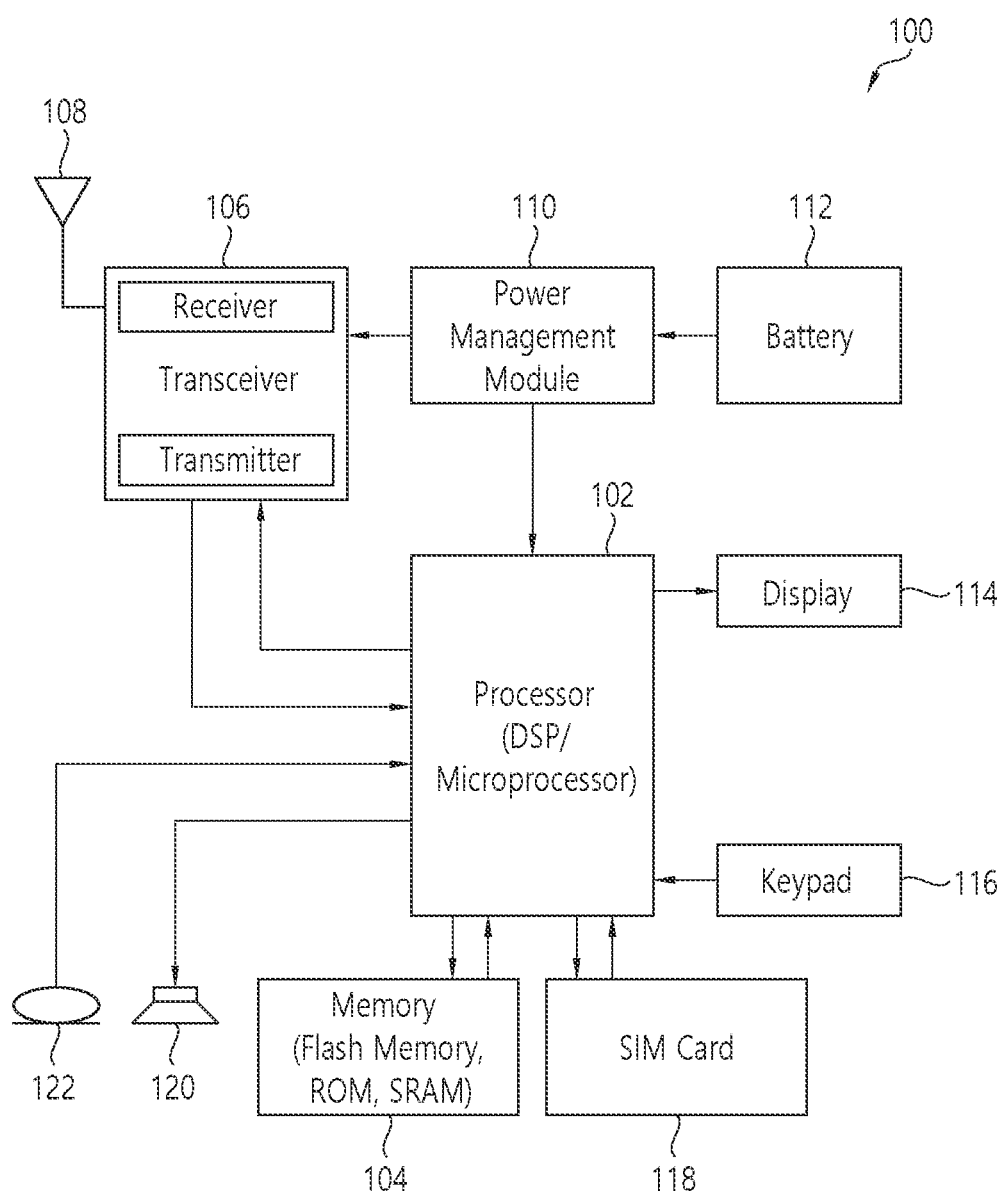
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor.

The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
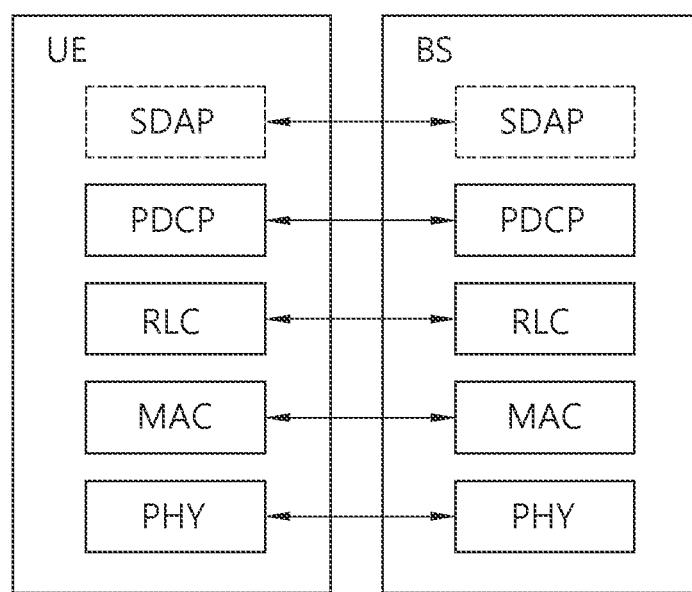
FIGS. 6 and 7 show an example of protocol stacks in a 3GPP based wireless communication system to which implementations of the present disclosure is applied.
Figure 7:
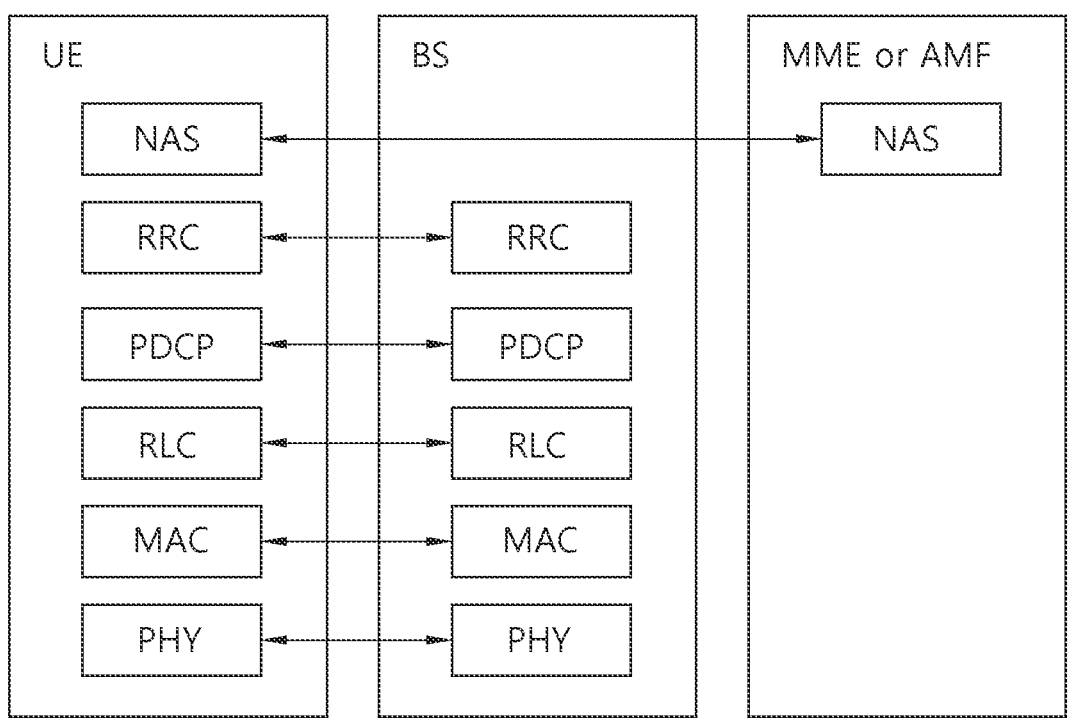

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
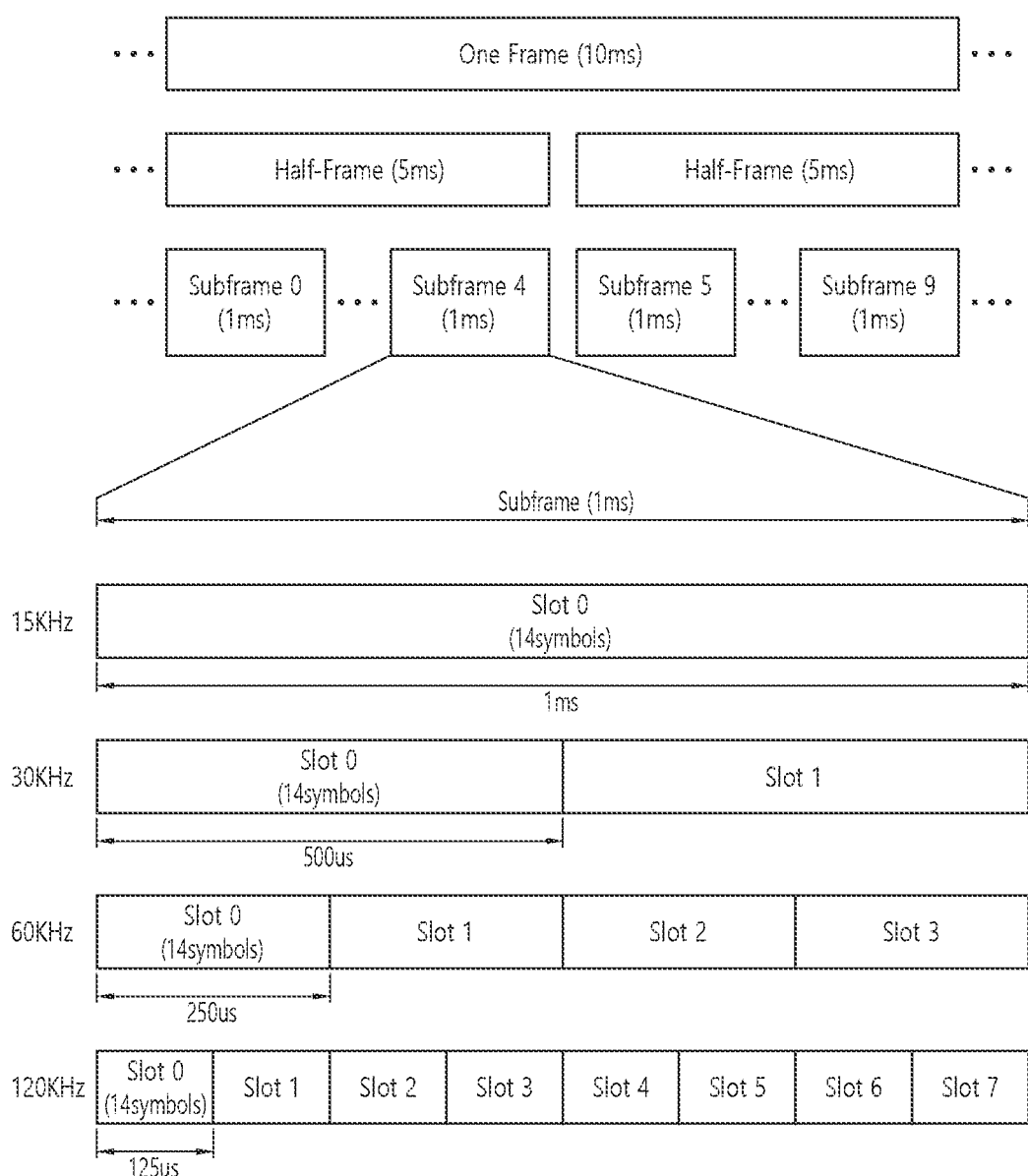
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe}_{slot}$ for the extended CP, according to the subcarrier spacing $\Delta f = 2^u * 15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i-1}$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell"

as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
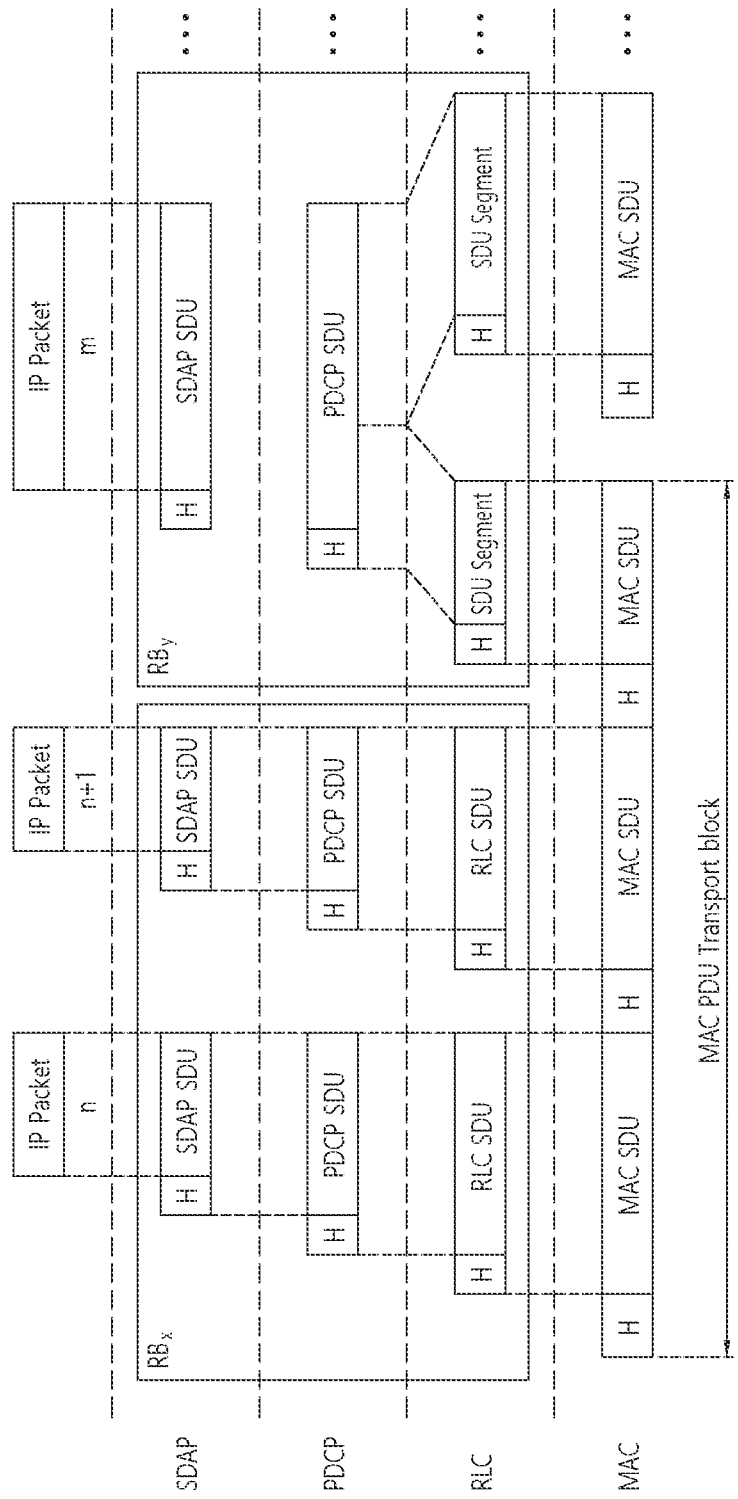
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a random access response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the cell radio network temporary identifier (C-RNTI) on PDCCH(s). A UE always monitors the PDCCH(s) in order to find possible grants for uplink transmission when its downlink reception is enabled (activity governed by discontinuous reception (DRX) when configured). In addition, with configured grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to configured scheduling RNTI (CS-RNTI) can either signal and activate the configured uplink grant, or deactivate it. That is, a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with semi-persistent Scheduling (SPS), the BS can allocate downlink resources for the initial HARQ transmissions to UEs. RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

For resource allocation by PDCCH (i.e., resource allocation by DCI), PDCCH can be used to schedule DL transmissions on PDSCH and UL transmissions on PUSCH, where the DCI on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 10:
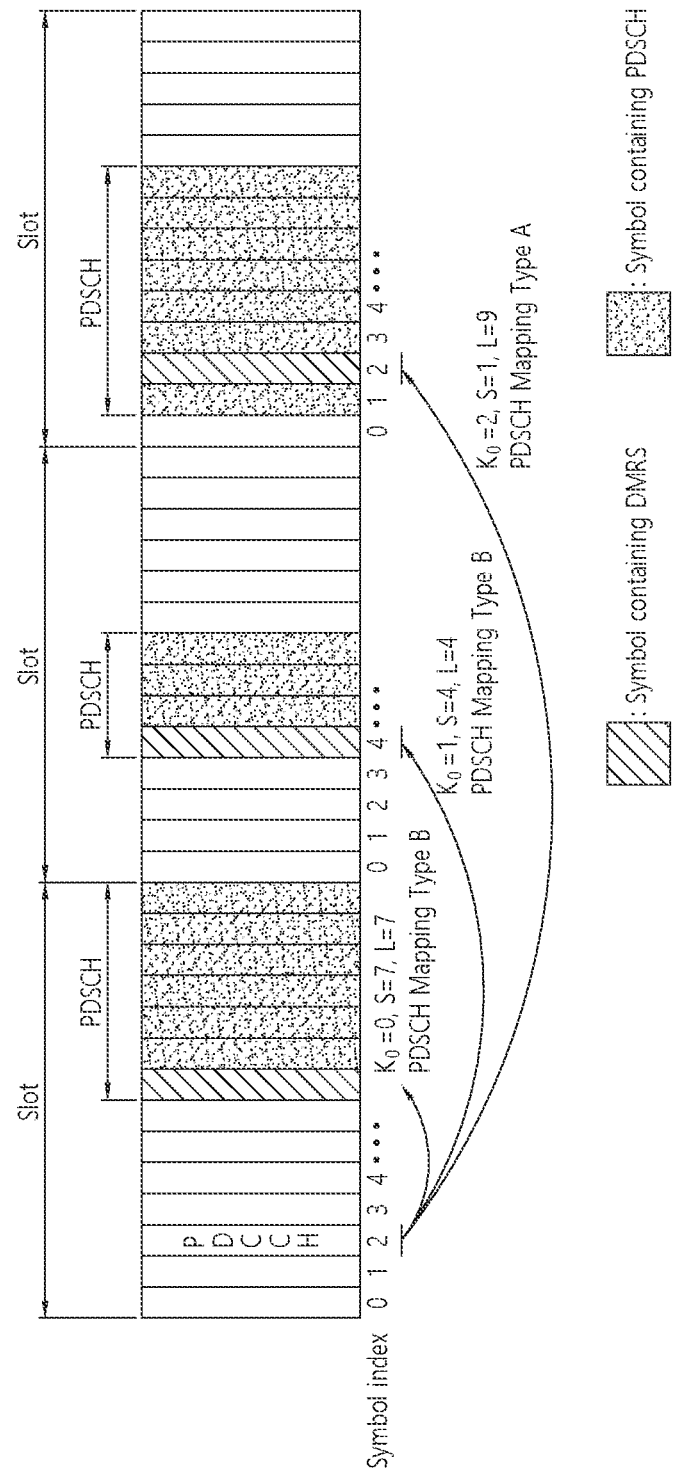
FIG. 10 shows an example of PDSCH time domain resource allocation by PDCCH to which implementations of the present disclosure is applied.
Figure 11:
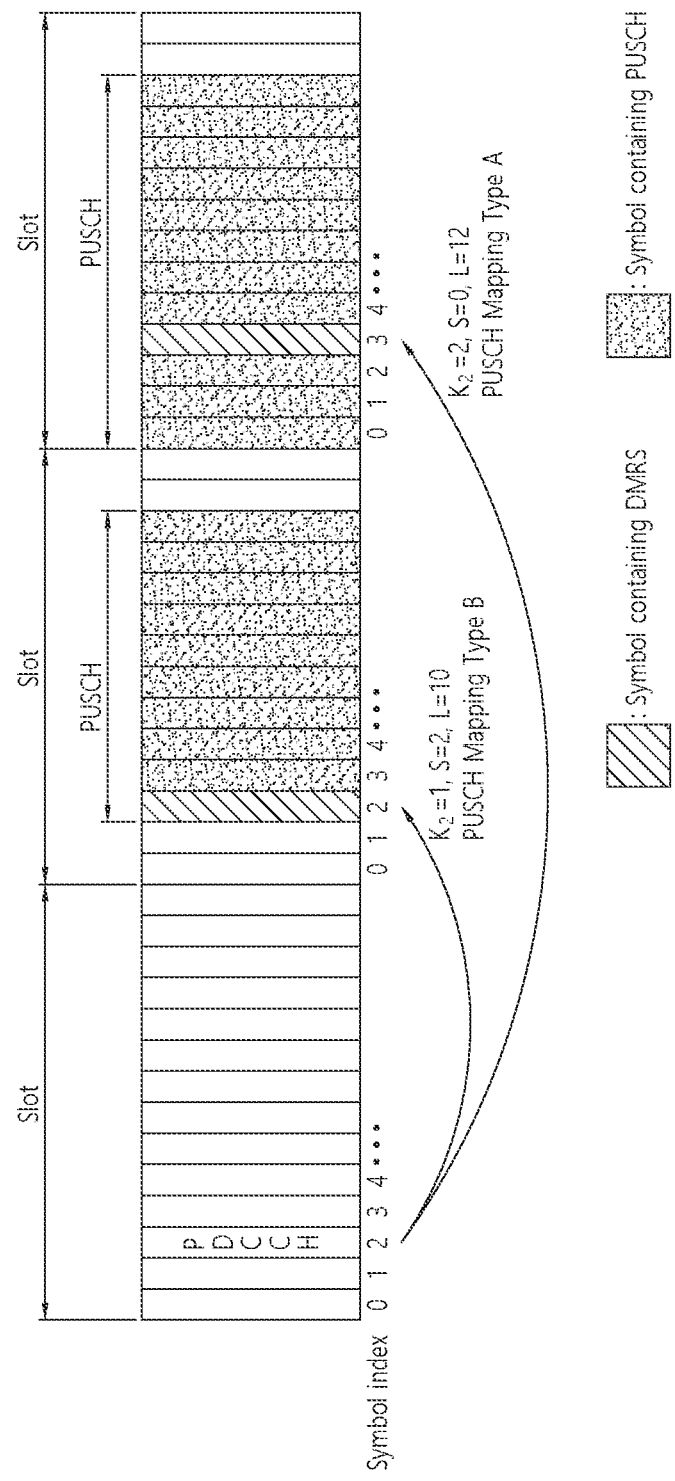
FIG. 11 shows an example of PUSCH time resource allocation by PDCCH to which implementations of the present disclosure is applied.

FIG. 10 shows an example of PDSCH time domain resource allocation by PDCCH to which implementations of the present disclosure is applied. FIG. 11 shows an example of PUSCH time resource allocation by PDCCH to which implementations of the present disclosure is applied.

DCI carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule.

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or 4th symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

For resource allocation by RRC, as mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:
cs-RNTI which is CS-RNTI for retransmission;
periodicity which provides periodicity of the configured grant Type 1;
timeDomainOffset which represents offset of a resource with respect to SFN=0 in time domain;
timeDomainAllocation value m which provides a row index m+1 pointing to an allocation table, indicating a combination of a start symbol S and length L and PUSCH mapping type;
frequencyDomainAllocation which provides frequency domain resource allocation; and
mcsAndTBS which provides $I_{MCS}$ representing the modulation order, target code rate and transport block size. Upon configuration of a configured grant Type 1 for a serving cell by RRC, the UE stores the uplink grant provided by RRC as a configured uplink grant for the indicated serving cell, and initialize or re-initialise the configured uplink grant to start in the symbol according to timeDomainOffset and S (derived from SLIV), and to reoccur with periodicity. After an uplink grant is configured for a configured grant Type 1, the UE considers that the uplink grant recurs associated with each symbol for which: [(SFN*numberOfSlotsPerFrame (numberOfSymbolsPerSlot)+(slot number in the frame×numberOfSymbolsPerSlot)+symbol number in the slot]= (timeDomainOffset*numberOfSymbolsPerSlot+S+N*periodicity) modulo (1024*numberOfSlotsPerFrame*numberOfSymbolsPerSlot), for all N>=0.

A UE is provided with at least the following parameters via RRC signaling from a BS when the configured gran Type 2 is configured:
cs-RNTI which is CS-RNTI for activation, deactivation, and retransmission; and
periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which: [(SFN*numberOfSlotsPerFrame*numberOfSymbolsPerSlot)+(slot number in the frame*numberOfSymbolsPerSlot)+symbol number in the slot]= [SFN$_{start\ time}$*numberOfSlotsPerFrame*numberOfSymbolsPerSlot+slot$_{start\ time}$*numberOfSymbolsPerSlot+symbol$_{start\ time}$) N*periodicity] modulo (1024× numberOfSlotsPerFrame*numberOfSymbolsPerSlot), for all N>=0, where SFN$_{start\ time}$, slot$_{start\ time}$, and symbol$_{starttime}$ are the SFN, slot, and symbol, respectively, of the first transmission opportunity of PUSCH where the configured uplink grant was (re-) initialised. numberOfSlotsPerFrame and numberOfSymbolsPerSlot refer to the number of consecutive slots per frame and the number of consecutive OFDM symbols per slot, respectively.

For downlink, a UE may be configured with SPS per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:

cs-RNTI which is CS-RNTI for activation, deactivation, and retransmission;

nrofHARQ-Processes: which provides the number of configured HARQ processes for SPS;

periodicity which provides periodicity of configured downlink assignment for SPS. When SPS is released by upper layers, all the corresponding configurations shall be released.

After a downlink assignment is configured for SPS, the UE considers sequentially that the $N^{th}$ downlink assignment occurs in the slot for which:

(numberOfSlotsPerFrame*SFN+slot number in the frame)=[(numberOfSlotsPerFrame*$SFN_{start\ time}$+$slot_{start\ time}$)+N*periodicity*numberOfSlotsPerFrame/10] modulo (1024*numberOfSlotsPerFrame), where $SFN_{start\ time}$ and $slot_{start\ time}$ are the SFN and slot, respectively, of the first transmission of PDSCH where the configured downlink assignment was (re-)initialized.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 5 or Table 6 below. Table 5 shows special fields for DL SPS and UL grant Type 2 scheduling activation PDCCH validation, and Table 6 shows special fields for DL SPS and UL grant Type 2 scheduling release PDCCH validation.

TABLE 5

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 6

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g., time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2.

The data unit(s) of the present disclosure is(are) subject to the physical layer processing at a transmitting side before transmission via radio interface, and the radio signals carrying the data unit(s) of the present disclosure are subject to the physical layer processing at a receiving side.

Figure 12:
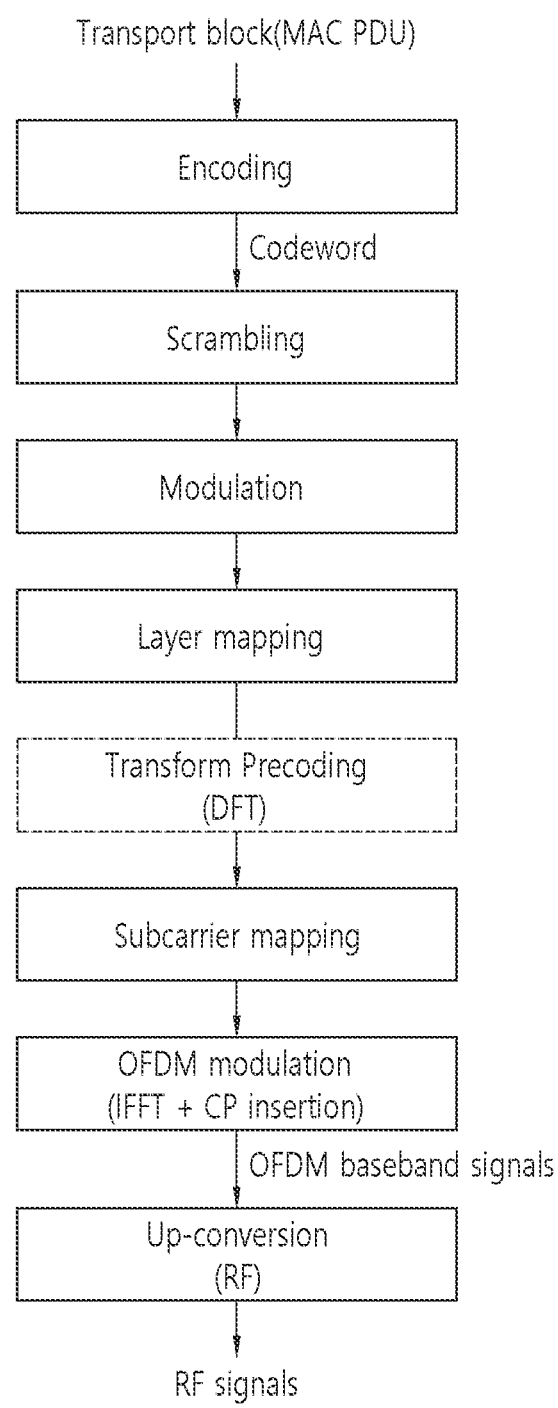
FIG. 12 shows an example of physical layer processing at a transmitting side to which implementations of the present disclosure is applied.

FIG. 12 shows an example of physical layer processing at a transmitting side to which implementations of the present disclosure is applied.

The following tables show the mapping of the transport channels and control information to its corresponding physical channels. In particular, Table 7 specifies the mapping of the uplink transport channels to their corresponding physical channels, Table 8 specifies the mapping of the uplink control channel information to its corresponding physical channel, Table 9 specifies the mapping of the downlink transport channels to their corresponding physical channels, and Table 10 specifies the mapping of the downlink control channel information to its corresponding physical channel.

TABLE 7

| Transport Channel | Physical Channel |
|---|---|
| UL-SCH | PUSCH |
| RACH | PRACH |

TABLE 8

| Control information | Physical Channel |
|---|---|
| UCI | PUCCH, PUSCH |

TABLE 9

| Transport Channel | Physical Channel |
|---|---|
| DL-SCH | PDSCH |
| BCH | PBCH |
| PCH | PDSCH |

TABLE 10

| Control information | Physical Channel |
|---|---|
| DCI | PDCCH |

Each step of FIG. 12 is described below in detail.

1) Encoding

Data and control streams from/to MAC layer are encoded to offer transport and control services over the radio transmission link in the PHY layer. For example, a transport block from MAC layer is encoded into a codeword at a transmitting side. Channel coding scheme is a combination of error detection, error correcting, rate matching, interleaving and transport channel or control information mapping onto/splitting from physical channels.

In the NR LTE system, following channel coding schemes are used for the different types of transport channels and the different control information types. Table 11 specifies the mapping of transport channels to respective coding scheme. Table 12 specifies the mapping of control information to respective coding scheme.

TABLE 11

| Transport Channel | Coding scheme |
| --- | --- |
| UL-SCH | Low density parity check (LDPC) code |
| DL-SCH | |
| PCH | |
| BCH | Polar code |

TABLE 12

| Control Information | Coding scheme |
| --- | --- |
| DCI | Polar code |
| UCI | Block code |
| | Polar code |

For transmission of a DL transport block (i.e., a DL MAC PDU) or a UL transport block (i.e., a UL MAC PDU), a transport block CRC sequence is attached to provide error detection for a receiving side. In the 3GPP NR system, the communication device uses LDPC codes in encoding/decoding UL-SCH and DL-SCH. The 3GPP NR system supports two LDPC base graphs (i.e., two LDPC base matrixes): LDPC base graph 1 optimized for small transport blocks and LDPC base graph 2 for larger transport blocks. Either LDPC base graph 1 or 2 is selected based on the size of the transport block and coding rate R. The coding rate R is indicated by the MCS index $I_{MCS}$. The MCS index is dynamically provided to a UE by PDCCH scheduling PUSCH or PDSCH, provided to a UE by PDCCH activating or (re-)initializing the UL configured grant 2 or DL SPS, or provided to a UE by RRC signaling related to the UL configured grant Type 1. If the CRC attached transport block is larger than the maximum code block size for the selected LDPC base graph, the CRC attached transport block may be segmented into code blocks, and an additional CRC sequence is attached to each code block. The maximum code block sizes for the LDPC base graph 1 and the LDPC base graph 2 are 8448 bits and 3480 bits, respectively. If the CRC attached transport block is not larger than the maximum code block size for the selected LDPC base graph, the CRC attached transport block is encoded with the selected LDPC base graph. Each code block of the transport block is encoded with the selected LDPC base graph. The LDPC coded blocks are then individually rat matched. Code block concatenation is performed to create a codeword for transmission on PDSCH or PUSCH. For PDSCH, up to 2 codewords (i.e., up to 2 transport blocks) can be transmitted simultaneously on the PDSCH. PUSCH can be used for transmission of UL-SCH data and layer 1/2 control information.

Although not shown in FIG. 12, the layer 1/2 control information may be multiplexed with the codeword for UL-SCH data.

2) Scrambling and Modulation

The bits of the codeword are scrambled and modulated to generate a block of complex-valued modulation symbols.

3) Layer Mapping

The complex-valued modulation symbols of the codeword are mapped to one or more multiple input multiple output (MIMO) layers. A codeword can be mapped to up to 4 layers. A PDSCH can carry two codewords, and thus a PDSCH can support up to 8-layer transmission. A PUSCH supports a single codeword, and thus a PUSCH can support up to 4-layer transmission.

4) Transform Precoding

The DL transmission waveform is conventional OFDM using a cyclic prefix (CP). For DL, transform precoding (in other words, DFT) is not applied.

The UL transmission waveform is conventional OFDM using a CP with a transform precoding function performing DFT spreading that can be disabled or enabled. In the 3GPP NR system, for UL, the transform precoding can be optionally applied if enabled. The transform precoding is to spread UL data in a special way to reduce peak-to-average power ratio (PAPR) of the waveform. The transform precoding is a form of DFT. In other words, the 3GPP NR system supports two options for UL waveform: one is CP-OFDM (same as DL waveform) and the other one is DFT-s-OFDM. Whether a UE has to use CP-OFDM or DFT-s-OFDM is determined by a BS via RRC parameters.

5) Subcarrier Mapping

The layers are mapped to antenna ports. In DL, for the layers to antenna ports mapping, a transparent manner (non-codebook based) mapping is supported and how beamforming or MIMO precoding is performed is transparent to the UE. In UL, for the layers to antenna ports mapping, both the non-codebook based mapping and a codebook based mapping are supported.

For each antenna port (i.e., layer) used for transmission of the physical channel (e.g., PDSCH, PUSCH), the complex-valued modulation symbols are mapped to subcarriers in resource blocks allocated to the physical channel.

6) OFDM Modulation

The communication device at the transmitting side generates a time-continuous OFDM baseband signal on antenna port p and subcarrier spacing configuration u for OFDM symbol l in a TTI for a physical channel by adding a CP and performing inverse fast Fourier transform (IFFT). For example, for each OFDM symbol, the communication device at the transmitting side may perform IFFT on the complex-valued modulation symbols mapped to resource blocks in the corresponding OFDM symbol and add a CP to the IFFT-ed signal to generate the OFDM baseband signal.

7) Up-Conversion

The communication device at the transmitting side up-convers the OFDM baseband signal for antenna port p, subcarrier spacing configuration u and OFDM symbol/to a carrier frequency $f_0$ of a cell to which the physical channel is assigned.

The processor 102, 202 in FIG. 2, the processor included in the communication unit 112 and/or the control unit 120 in FIG. 3, the processor 102, 202 in FIG. 4 and/or the processor 102 in FIG. 5 may be configured to perform encoding, schrambling, modulation, layer mapping, transform precoding (for UL), subcarrier mapping, and OFDM modulation. The processor 102, 202 in FIG. 2, the processor included in the communication unit 112 and/or the control unit 120 in FIG. 3, the processor 102, 202 in FIG. 4 and/or the processor 102 in FIG. 5 may control the transceiver 106, 206 in FIG. 2, the transceiver 114 in FIG. 3, the transceiver 106, 206 in FIG. 4 and/or the transceiver 106 in FIG. 5 to up-convert the OFDM baseband signal onto the carrier frequency to generate radio frequency (RF) signals. The radio frequency signals are transmitted through antennas to an external device.

Figure 13:
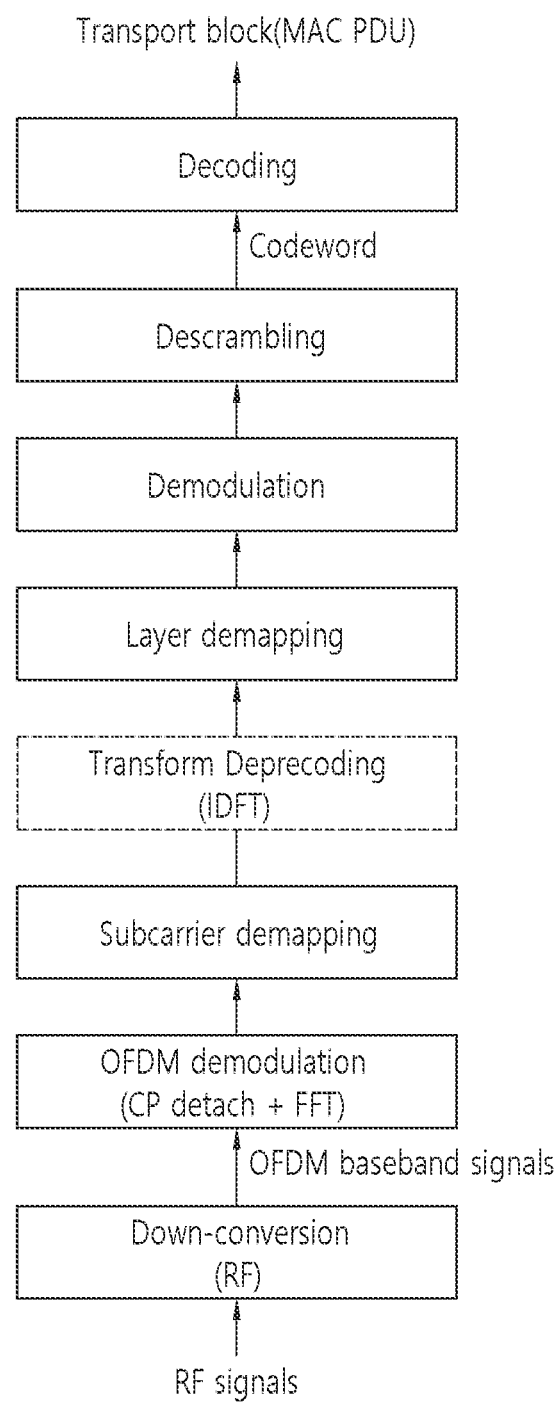
FIG. 13 shows an example of physical layer processing at a receiving side to which implementations of the present disclosure is applied.

FIG. 13 shows an example of physical layer processing at a receiving side to which implementations of the present disclosure is applied.

The physical layer processing at the receiving side is basically the inverse processing of the physical layer processing at the transmitting side. Each step of FIG. 13 is described below in detail.

1) Frequency Down-Conversion

The communication device at a receiving side receives RF signals at a carrier frequency through antennas. The transceiver 106, 206 in FIG. 2, the transceiver 114 in FIG. 3, the transceiver 106, 206 in FIG. 4 and/or the transceiver 106 in FIG. 5 receiving the RF signals at the carrier frequency down-converts the carrier frequency of the RF signals into the baseband in order to obtain OFDM baseband signals.

2) OFDM Demodulation

The communication device at the receiving side obtains complex-valued modulation symbols via CP detachment and FFT. For example, for each OFDM symbol, the communication device at the receiving side removes a CP from the OFDM baseband signals and performs FFT on the CP-removed OFDM baseband signals to obtain complex-valued modulation symbols for antenna port p, subcarrier spacing u and OFDM symbol 1.

3) Subcarrier De-Mapping

The subcarrier de-mapping is performed on the complex-valued modulation symbols to obtain complex-valued modulation symbols of a corresponding physical channel. For example, the UE processor may obtain complex-valued modulation symbols mapped to subcarriers belong to PDSCH from among complex-valued modulation symbols received in a bandwidth part.

4) Transform De-Precoding

Transform de-precoding (e.g., inverse DFT (IDFT)) is performed on the complex-valued modulation symbols of the uplink physical channel if the transform precoding has been enabled for the uplink physical channel. For the downlink physical channel and for the uplink physical channel for which the transform precoding has been disabled, the transform de-precoding is not performed.

5) Layer De-Mapping.

The complex-valued modulation symbols are de-mapped into one or two codewords.

6) Demodulation and De-Scrambling

The complex-valued modulation symbols of a codeword are demodulated and descrambled into bits of the codeword.

7) Decoding

The codeword is decoded into a transport block. For UL-SCH and DL-SCH, either LDPC base graph 1 or 2 is selected based on the size of the transport block and coding rate R. The codeword may include one or multiple coded blocks. Each coded block is decoded with the selected LDPC base graph into a CRC-attached code block or CRC-attached transport block. If code block segmentation was performed on a CRC-attached transport block at the transmitting side, a CRC sequence is removed from each of CRC-attached code blocks, whereby code blocks are obtained. The code blocks are concatenated into a CRC-attached transport block. The transport block CRC sequence is removed from the CRC-attached transport block, whereby the transport block is obtained. The transport block is delivered to the MAC layer.

In the above described physical layer processing at the transmitting and receiving sides, the time and frequency domain resources (e.g., OFDM symbol, subcarriers, carrier frequency) related to subcarrier mapping, OFDM modulation and frequency up/down conversion can be determined based on the resource allocation (e.g., UL grant, DL assignment).

Packet duplication is described. Section 16.1.3 of 3GPP TS 38.300 V15.4.0 (2018-12) can be referred.

When duplication is configured for a radio bearer by RRC, a secondary RLC entity is added to the radio bearer to handle the duplicated PDCP PDUs, where the logical channel corresponding to the primary RLC entity is referred to as the primary logical channel, and the logical channel corresponding to the secondary RLC entity, the secondary logical channel. Duplication at PDCP therefore consists in submitting the same PDCP PDUs twice: once to the primary RLC entity and a second time to the secondary RLC entity. With two independent transmission paths, packet duplication therefore increases reliability and reduces latency and is especially beneficial for URLLC services.

PDCP control PDUs are not duplicated and always submitted to the primary RLC entity.

When configuring duplication for a DRB, RRC also sets the initial state (either activated or deactivated). After the configuration, the state can then be dynamically controlled by means of a MAC control element (CE) and in dual connectivity (DC), the UE applies the MAC CE commands regardless of their origin (MCG or SCG). When duplication is configured for an SRB, the state is always active and cannot be dynamically controlled.

When activating duplication for a DRB, NG-RAN should ensure that at least one serving cell is activated for each logical channel of the DRB. And when the deactivation of SCells leaves no serving cells activated for a logical channel of the DRB, NG-RAN should ensure that duplication is also deactivated.

When duplication is activated, the original PDCP PDU and the corresponding duplicate shall not be transmitted on the same carrier. The primary and secondary logical channels can either belong to the same MAC entity (referred to as CA duplication) or to different ones (referred to as DC duplication). In CA duplication, logical channel mapping restrictions are used in MAC to ensure that the primary and secondary logical channels are not sent on the same carrier.

When duplication is deactivated for a DRB, the secondary RLC entity is not re-established, the HARQ buffers are not flushed, and the transmitting PDCP entity should indicate to the secondary RLC entity to discard all duplicated PDCP PDUs. In addition, in case of CA duplication, the logical channel mapping restrictions of the primary and secondary logical channels are lifted for as long as duplication remains deactivated.

When an RLC entity acknowledges the transmission of a PDCP PDU, the PDCP entity shall indicate to the other RLC entity to discard it. And when the secondary RLC entity reaches the maximum number of retransmissions for a PDCP PDU, the UE informs the gNB but does not trigger RLF.

Packet duplication can be used to increase packet transmission reliability as well as to reduce average packet transmission delay. However, the gain in terms of reliability as well as delay comes at cost of additional utilization of radio resources as well as increased power consumption. In addition, if unnecessary packet duplication is excessively used without proper control, the duplicated packets may unnecessarily congest available capacity for the UE and hence block other traffic flows for the UE as well as other UEs. This may necessitates conditional packet duplication with well specified conditions.

To reduce scheduling latency, configured grant may be configured. With configured grants, the gNB can allocate uplink resources for the initial HARQ transmissions to UEs. Two types of configured uplink grants are defined:

With Type 1, RRC directly provides the configured uplink grant (including the periodicity).

With Type 2, RRC defines the periodicity of the configured uplink grant while PDCCH addressed to configured scheduling RNTI (CS-RNTI) can either signal and activate the configured uplink grant, or deactivate it. That is, a PDCCH addressed to CS-RNTI indicates that the uplink grant can be implicitly reused according to the periodicity defined by RRC, until deactivated.

However, if configured grant is configured and/or activated all the time but actual utilization of the configured grant is low, the configured grant can be wasted. On the other hand, if the configured grant is dynamically activated when packet duplication becomes necessary, it incurs additional delay caused by the activation itself.

Therefore, in the description below, a method for achieving both minimization of packet transmission delay and minimization of extra transmission resources is described according to implementations of the present disclosure. The description below according to implementations of the present disclosure focuses on the uplink transmission for the sake of convenience, but implementations of the present disclosure can also be applied to downlink transmission as well.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 14:
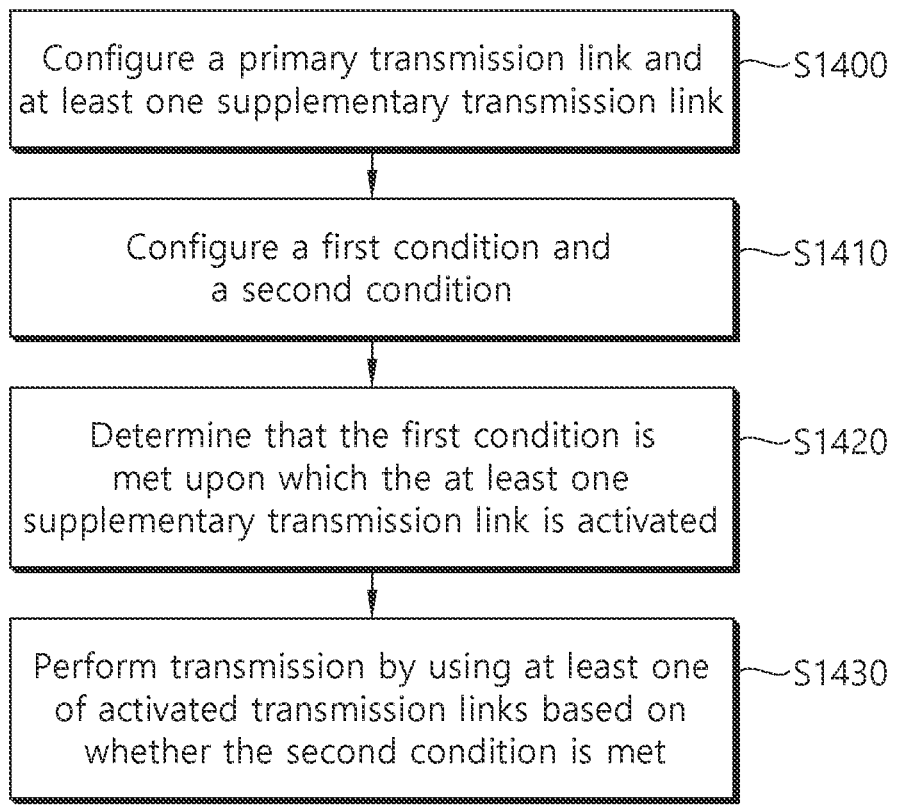
FIG. 14 shows an example of a method for a wireless device to which implementations of the present disclosure is applied.

FIG. 14 shows an example of a method for a wireless device to which implementations of the present disclosure is applied.

In step S1400, the wireless device configures a primary transmission link and at least one supplementary transmission link.

In some implementations, a wireless device may be configured with the primary transmission link and at least one supplementary transmission links.

In some implementations, the primary transmission link may be related to the logical channel corresponding to the primary RLC entity, i.e., the primary logical channel. The supplementary transmission link may be related to the logical channel corresponding to the secondary RLC entity, i.e., the secondary logical channel.

In some implementations, the primary transmission link and the supplementary transmission link may be applicable for transmission of a traffic and/or packet flow. The primary transmission link and the supplementary transmission link may be subject to multi-link packet transmission of the traffic and/or packet flow.

In some implementations, the multi-link packet transmission may be include duplicate transmission. By the duplicate transmission, same packet may be transmitted over multiple transmission links to increase transmission reliability as well as to reduce latency.

In some implementations, the multi-link packet transmission may be include selective link transmission. By the selective link transmission, a subset of transmission links may be selected from multiple transmission link candidates for actual transmission link so that better transmission link can be used as much as possible.

The network may configure the wireless device with applicable multi-link packet transmission scheme for the traffic/packet flow among the aforementioned options including duplicate transmission and/or selective link transmission.

In step S1410, the wireless device configures a first condition and a second condition.

In some implementations, the first condition may be related to the first state. For example, the wireless device may be under the first state upon that (e.g., when) the first condition 1 is met.

In some implementations, the second condition may be related to the second state. For example, the wireless device may be under the second state upon that (e.g., when) the second condition is met.

In some implementation, under the first state, the wireless device may and/or may be expected to experience a potential degradation of transmission performance. That is, the first state may indicate that transmission is under some but not severe problem.

In some implementation, under the second state, the wireless device is currently experiencing and/or is highly likely to experience actual degradation of transmission performance. The second state may indicate higher risk of transmission performance degradation than the first state. That is, the second state may indicate that transmission is actually under severe problem. Hence, the first state may be pre-condition to detect the second state, i.e. the second condition may be satisfied only after the first condition is satisfied.

In some implementations, the conditions may be evaluated as follows.

If the first condition becomes satisfied while the first condition has not been satisfied, the wireless device may determine that entering condition of the first condition is satisfied. When the entering condition of the first condition is satisfied, the wireless device may be under the first state.

If the second condition becomes satisfied while the second condition has not been satisfied, the wireless device may determine that entering condition of the second condition is satisfied. When the entering condition of the second condition is satisfied, the wireless device may be under the second state.

If the first condition becomes not satisfied while the first condition has been satisfied, the wireless device may determine that leaving condition of the first condition is satisfied. When the leaving condition of the first condition is satisfied, the wireless device may not be under the first state. The wireless device may be under good condition.

If the second condition becomes not satisfied while the second condition has been satisfied, the wireless device may determine that leaving condition of the second condition is satisfied. When the leaving condition of the second condition is satisfied, the wireless device may not be under the second state. The wireless device may be under the first state.

To avoid ping-pong between entering and leaving conditions, hysteresis may be applied for each of the condition.

In some implementations, the conditions may be defined as follows. The conditions may include at least one of the following options.

(1) Option 1: Serving Cell Quality Related Conditions

First condition: Serving cell quality (e.g., reference signal received power (RSRP)) is lower than the first threshold.

Second condition: Serving cell quality (e.g., RSRP) is lower than the second threshold that is not higher than the first threshold, where the same value for two thresholds are not precluded.

(2) Option 2: Transmission Delay Related Conditions

First condition: Transmission delay is higher than the first threshold.

Second condition: Transmission delay is higher than the second threshold that is not lower than the first threshold, where the same value for two thresholds are not precluded.

Transmission delay may include queueing delay in the transmission buffer at a particular L2 entity (e.g., PDCP or RLC transmission buffer). Transmission delay may possibly include transmission delay at physical layer as well. Transmission delay may be averaged over a determined period of time and/or via exponentially weighted moving average.

(3) Option 3: Queued Packet Size in Transmission Buffer Related Conditions

First condition: Queued packet size is higher than the first threshold.

Second condition: Queued packet size is higher than the second threshold that is not lower than the first threshold, where the same value for two thresholds are not precluded.

Queued packet size may include queued packet size in the transmission buffer at a particular L2 entity (e.g., PDCP and/or RLC transmission buffer). Queued packet size may be averaged over a determined period of time and/or via exponentially weighted moving average.

In step S1420, the wireless device determines that the first condition is met upon which the at least one supplementary transmission link is activated.

In some implementations, the wireless device may request to the network activation of the at least one supplementary transmission link and/or the configured grant for the at least one supplementary transmission link. This request may correspond to reporting of the first condition being satisfied. Upon reception of the request for activation of the at least one supplementary transmission link and/or the configured grant for the at least one supplementary transmission link, the network may activate the at least one supplementary transmission link and/or the configured grant for the at least one supplementary transmission link In some implementations, the wireless device may autonomously activate the at least one supplementary transmission link and/or the configured grant for the at least one supplementary transmission link. Then, the wireless device may indicate to the network that the at least one supplementary transmission link and/or the configured grant for the at least one supplementary transmission link is activated by the wireless device autonomously.

In step S1430, the wireless device performs transmission by using at least one of activated transmission links based on whether the second condition is met.

In some implementations, upon that (e.g., when) the second is not met, i.e., the wireless device is under the first state, the wireless device may perform transmission by using the activated primary transmission link.

In some implementations, upon that (e.g., when) the second is met, i.e., the wireless device is under the second state, the wireless device may perform transmission by using at least one of activated transmission links including the primary transmission link and the at least one supplementary transmission link.

In some implementations, the wireless device may perform duplicate transmission by using activated transmission links including the primary transmission link and the at least one supplementary transmission link for the concerned traffic/packet flow. The same packet is transmitted over the activated transmission links including the primary transmission link and the at least one supplementary transmission link.

In some implementations, the wireless device may select at least one transmission link from the activated transmission links including the primary transmission link and the at least one supplementary transmission link for the concerned traffic/packet flow. The selected transmission link may be one of the at least one supplementary transmission link other than the primary transmission link that experiences transmission performance degradation.

Figure 15:
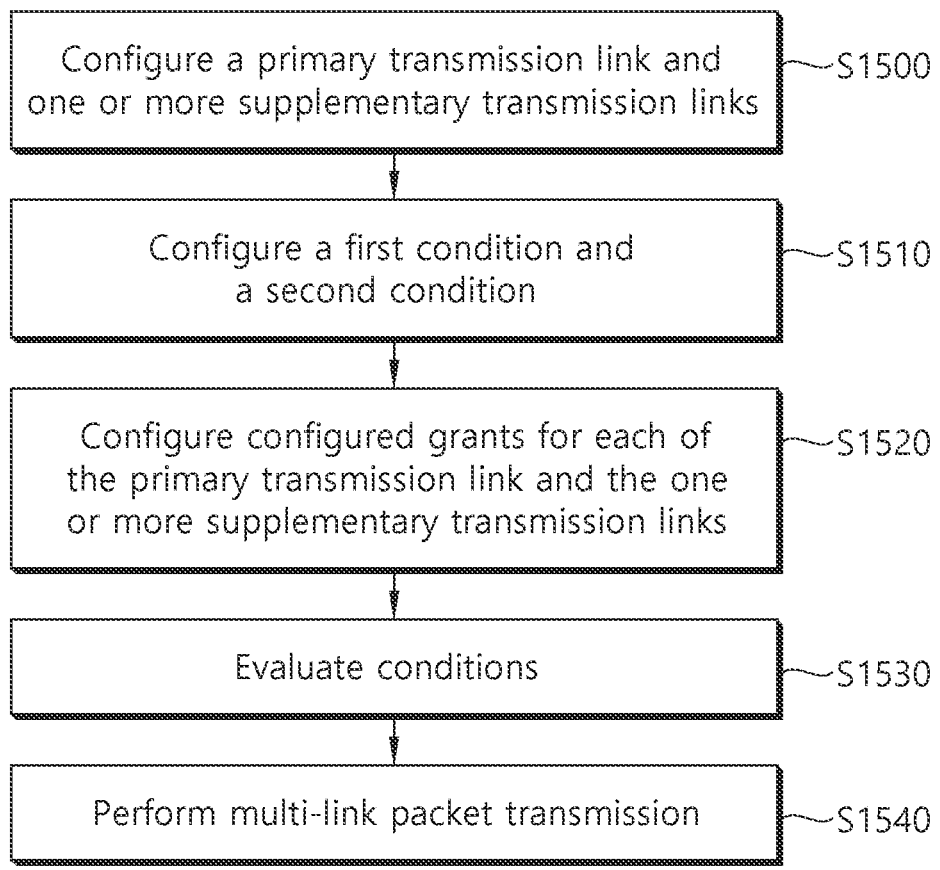
FIG. 15 shows another example of a method for a wireless device to which implementations of the present disclosure is applied.

FIG. 15 shows another example of a method for a wireless device to which implementations of the present disclosure is applied.

In step S1500, the wireless device configures a primary transmission link and one or more supplementary transmission links.

In some implementations, a wireless device may be configured with the primary transmission link and one or more supplementary transmission links.

In some implementations, the primary transmission link may be related to the logical channel corresponding to the primary RLC entity, i.e., the primary logical channel. The supplementary transmission link may be related to the logical channel corresponding to the secondary RLC entity, i.e., the secondary logical channel.

In some implementations, the primary transmission link and the supplementary transmission link may be applicable for transmission of a traffic and/or packet flow. The primary transmission link and the supplementary transmission link may be subject to multi-link packet transmission of the traffic and/or packet flow.

In some implementations, the multi-link packet transmission may be include duplicate transmission. By the duplicate transmission, same packet may be transmitted over multiple transmission links to increase transmission reliability as well as to reduce latency.

In some implementations, the multi-link packet transmission may be include selective link transmission. By the selective link transmission, a subset of transmission links may be selected from multiple transmission link candidates for actual transmission link so that better transmission link can be used as much as possible.

The network may configure the wireless device with applicable multi-link packet transmission scheme for the traffic/packet flow among the aforementioned options including duplicate transmission and/or selective link transmission.

In step S1510, the wireless device configures a first condition (i.e., Condition 1) and a second condition (i.e., Condition 2).

In some implementations, the wireless device may be configured with Condition 1 and Condition 2.

In some implementations, the Condition 1 may be related to State 1. For example, the wireless device may be under State 1 upon that (e.g., when) the Condition 1 is met.

In some implementations, the Condition 2 may be related to State 2. For example, the wireless device may be under State 2 upon that (e.g., when) the Condition 2 is met.

In some implementation, under the State 1, the wireless device may and/or may be expected to experience a potential degradation of transmission performance. That is, the State 1 may indicate that transmission is under some but not severe problem.

In some implementation, under the State 2, the wireless device is currently experiencing and/or is highly likely to experience actual degradation of transmission performance. The State 2 may indicate higher risk of transmission performance degradation than the State 1. That is, the State 2 may indicate that transmission is actually under severe problem. Hence, the State 1 may be pre-condition to detect the State 2, i.e. the Condition 2 may be satisfied only after the Condition 1 is satisfied.

In some implementations, the conditions may be evaluated as follows.

If the Condition 1 becomes satisfied while the Condition 1 has not been satisfied, the wireless device may determine that entering condition of the Condition 1 is satisfied. When the entering condition of the Condition 1 is satisfied, the wireless device may be under the State 1.

If the Condition 2 becomes satisfied while the Condition 2 has not been satisfied, the wireless device may determine that entering condition of the Condition 2 is satisfied. When the entering condition of the Condition 2 is satisfied, the wireless device may be under the State 2.

If the Condition 1 becomes not satisfied while the Condition 1 has been satisfied, the wireless device may determine that leaving condition of the Condition 1 is satisfied. When the leaving condition of the Condition 1 is satisfied, the wireless device may not be under the State 1. The wireless device may be under good condition.

If the Condition 2 becomes not satisfied while the Condition 2 has been satisfied, the wireless device may determine that leaving condition of the Condition 2 is satisfied. When the leaving condition of the Condition 2 is satisfied, the wireless device may not be under the State 2. The wireless device may be under the State 1.

To avoid ping-pong between entering and leaving conditions, hysteresis may be applied for each of the condition.

In some implementations, the conditions may be defined as follows. The conditions may include at least one of the following options.

(1) Option 1: Serving Cell Quality Related Conditions
   Condition 1: Serving cell quality (e.g., reference signal received power (RSRP)) is lower than Threshold 1.
   Condition 2: Serving cell quality (e.g., RSRP) is lower than Threshold 2 that is not higher than Threshold 1, where the same value for two thresholds are not precluded.

(2) Option 2: Transmission Delay Related Conditions
   Condition 1: Transmission delay is higher than Threshold 1.
   Condition 2: Transmission delay is higher than Threshold 2 that is not lower than Threshold 1, where the same value for two thresholds are not precluded.
   Transmission delay may include queueing delay in the transmission buffer at a particular L2 entity (e.g., PDCP or RLC transmission buffer). Transmission delay may possibly include transmission delay at physical layer as well. Transmission delay may be averaged over a determined period of time and/or via exponentially weighted moving average.

(3) Option 3: Queued Packet Size in Transmission Buffer Related Conditions
   Condition 1: Queued packet size is higher than Threshold 1.
   Condition 2: Queued packet size is higher than Threshold 2 that is not lower than Threshold 1, where the same value for two thresholds are not precluded.
   Queued packet size may include queued packet size in the transmission buffer at a particular L2 entity (e.g., PDCP and/or RLC transmission buffer). Queued packet size may be averaged over a determined period of time and/or via exponentially weighted moving average.

In step S1520, the wireless device configures configured grants for each of the primary transmission link and the one or more supplementary transmission links.

In some implementations, the wireless device may be configured with configured grants for each of the primary transmission link and the supplementary transmission link(s), respectively.

In some implementations, the configured grant for the primary transmission link may be activated by default and/or explicit network command. The configured grant for the supplementary transmission link may be deactivated by default and/or explicit network command.

In step S1530, the wireless device evaluates the conditions and performs the corresponding behaviors as follows.

(1) Evaluation of the Condition 1
   If the entering condition for the Condition 1 is satisfied, i.e., the wireless device is under the State 1, the wireless device may request to the network activation of the configured grant for the supplementary transmission link. This request may be equivalent to reporting of the entering condition for the Condition 1 being satisfied. Upon reception of the request for activation of the configured grant for the supplementary transmission link, the network may activate the configured grant for the supplementary transmission link(s).
   Alternatively, if the entering condition for the Condition 1 is satisfied, i.e., the wireless device is under the State 1, the wireless device may indicate to the network that the wireless device autonomously activates the configured grant for the chosen or applicable supplementary transmission link and activates the corresponding configured grant.
   If the leaving condition for the Condition 1 is satisfied, i.e., the wireless device is not under the State 1 anymore, the wireless device may request to the network deactivation of the configured grant for the supplementary transmission link. This request may be equivalent to reporting of the leaving condition for the Condition 1 being satisfied. Upon reception of the request for deactivation of the configured grant for the supplementary transmission link, the network may deactivate the configured grant for the supplementary transmission link(s).
   Alternatively, if the leaving condition for the Condition 1 is satisfied, i.e., the wireless device is not under the State 1 anymore, the wireless device may indicate to the network that the wireless device autonomously deactivates the configured grant for the chosen or applicable supplementary transmission link and deactivates the corresponding configured grant.

(2) Evaluation of the Condition 2
   While the entering condition of the Condition 2 is satisfied, i.e., the wireless device is under the State 2, the wireless device may consider that it is allowed to use the activated configured grant for the supplementary transmission link(s) for transmission of the traffic/packet flow.

While the entering condition of the Condition 2 is not satisfied, i.e., the wireless device is not under the State 2, the wireless device may consider that it is not allowed to use the activated configured grant for the supplementary transmission link(s) for transmission of the traffic/packet flow.

In summary, when the entering condition of the Condition 1 is satisfied, i.e., the wireless device is under the State 1, the configured grant for the supplementary transmission link can be activated, but cannot be used yet. Only while the entering condition of the Condition 2 is satisfied, i.e., the wireless device is under the State 2, it is allowed to use the activated configured grant for the supplementary transmission link.

In step S1540, the wireless device performs multi-link packet transmission as follows.

In some implementations, if the wireless device is configured to perform duplicate transmission for the concerned traffic/packet flow, the wireless device may perform duplicate transmission by using activated configured grants over the multiple transmission links applicable for the concerned traffic/packet flow. The actual transmission links may include the primary transmission link and supplementary transmission links (duplicate transmission).

In some implementations, if the wireless device is configured to perform selective link transmission for the concerned traffic/packet flow, the wireless device may choose at least one transmission link over the multiple transmission links applicable for the concerned traffic/packet flow. The chosen transmission link may be one of supplementary transmission link(s) other than the primary transmission link that experiences transmission performance degradation (link diversity transmission).

Figure 16:
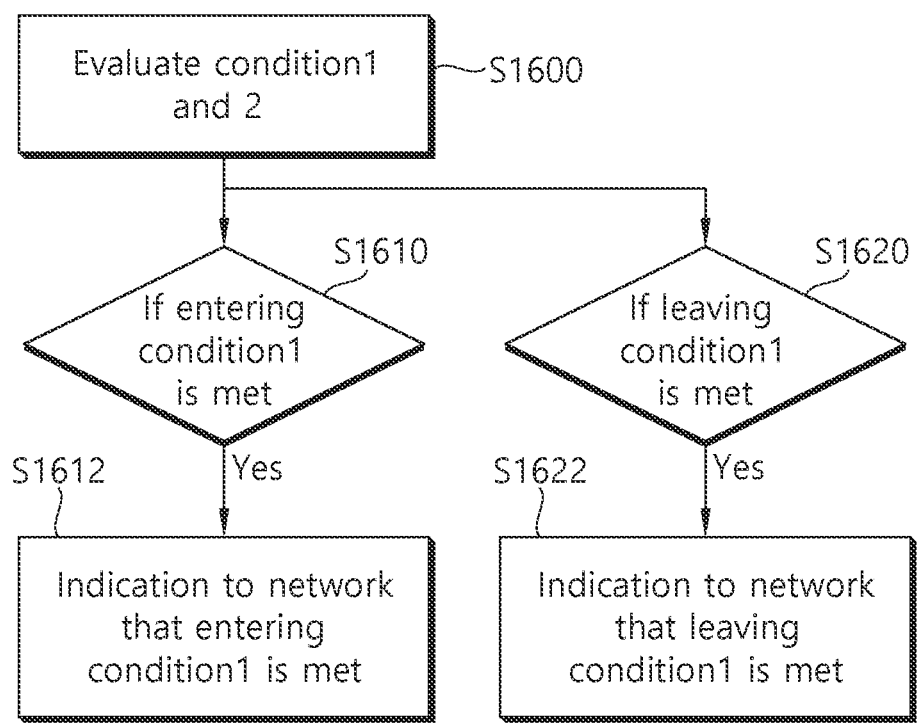
FIG. 16 shows an example of evaluation of condition for dynamic grant activation for supplementary transmission link to which implementations of the present disclosure is applied.

FIG. 16 shows an example of evaluation of condition for dynamic grant activation for supplementary transmission link to which implementations of the present disclosure is applied.

In step S1600, the wireless device evaluates Condition 1 and Condition 2. The Condition 1 and the Condition 2 may be evaluated as described above in FIG. 15.

In step S1610, the wireless device evaluates whether the entering condition of the Condition 1 is met. If yes, i.e., the wireless device is under the State 1, in step S1612, the wireless device indicates to the network that the entering condition of the Condition 1 is met. The indication of the entering condition of the Condition 1 being met may correspond to request for activation of the configured grant for the supplementary transmission link.

In step S1620, the wireless device evaluates whether the leaving condition of the Condition 1 is met. If yes, i.e., the wireless device is not under the State 1 anymore, in step S1622, the wireless device indicates to the network that the leaving condition of the Condition 1 is met. The indication of the leaving condition of the Condition 1 being met may correspond to request for deactivation of the configured grant for the supplementary transmission link.

Figure 17:
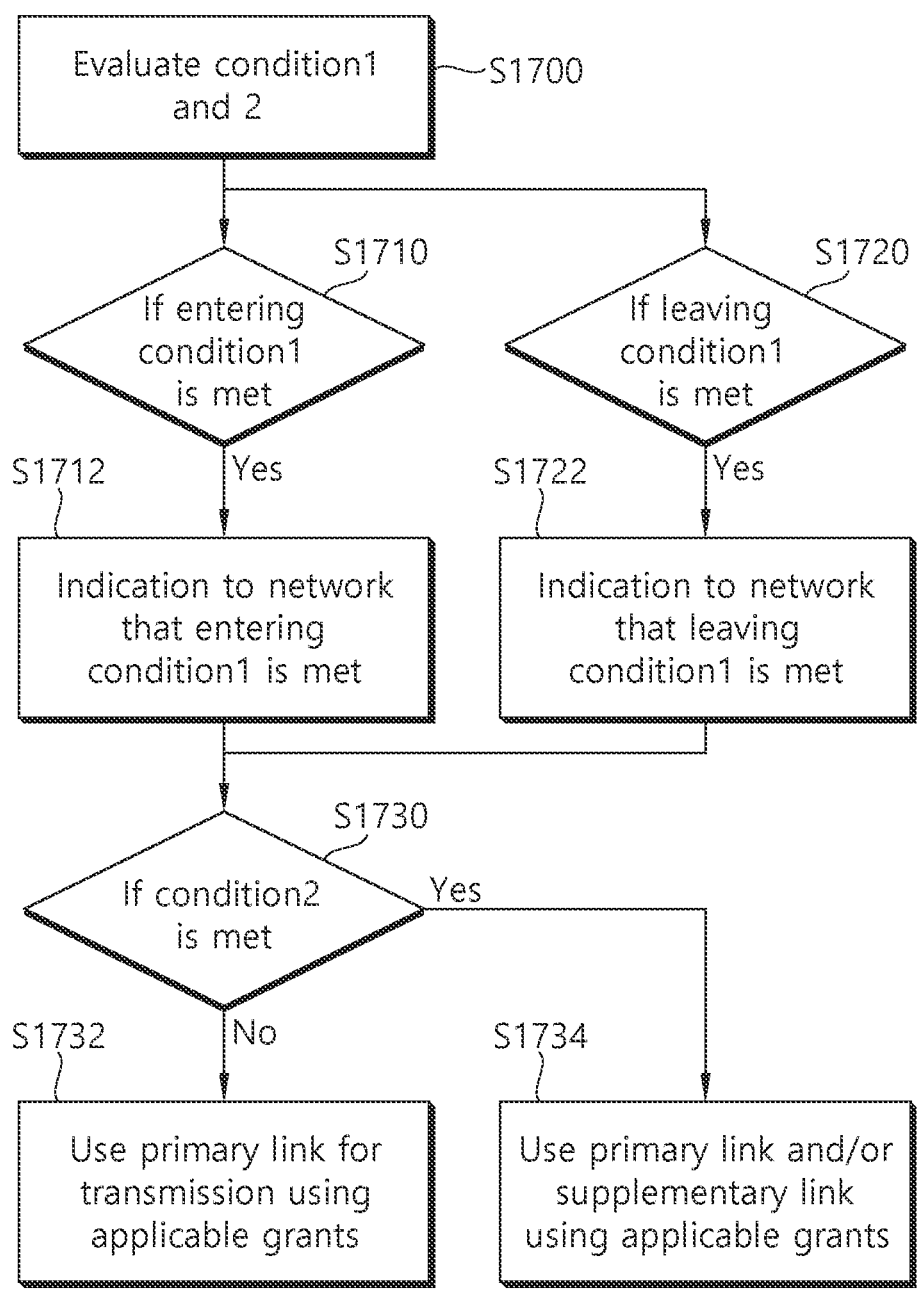
FIG. 17 shows another example of evaluation of condition for dynamic grant activation for supplementary transmission link to which implementations of the present disclosure is applied.

FIG. 17 shows another example of evaluation of condition for dynamic grant activation for supplementary transmission link to which implementations of the present disclosure is applied.

Each of steps S1700 to S1722 shown in FIG. 17 corresponds to each of steps S1600 to S1622 shown in FIG. 16.

In step S1730, the wireless device evaluates whether the (entering) condition of the Condition 2 is met. If no, i.e., the wireless device is under the State 1, in step S1732, the wireless device uses the primary transmission link for transmission using applicable (configured) grants. If yes, i.e., the wireless device is under the State 2, in step S1734, the wireless device uses the primary transmission link and/or supplementary transmission link for transmission using applicable (configured) grants.

Figure 18:
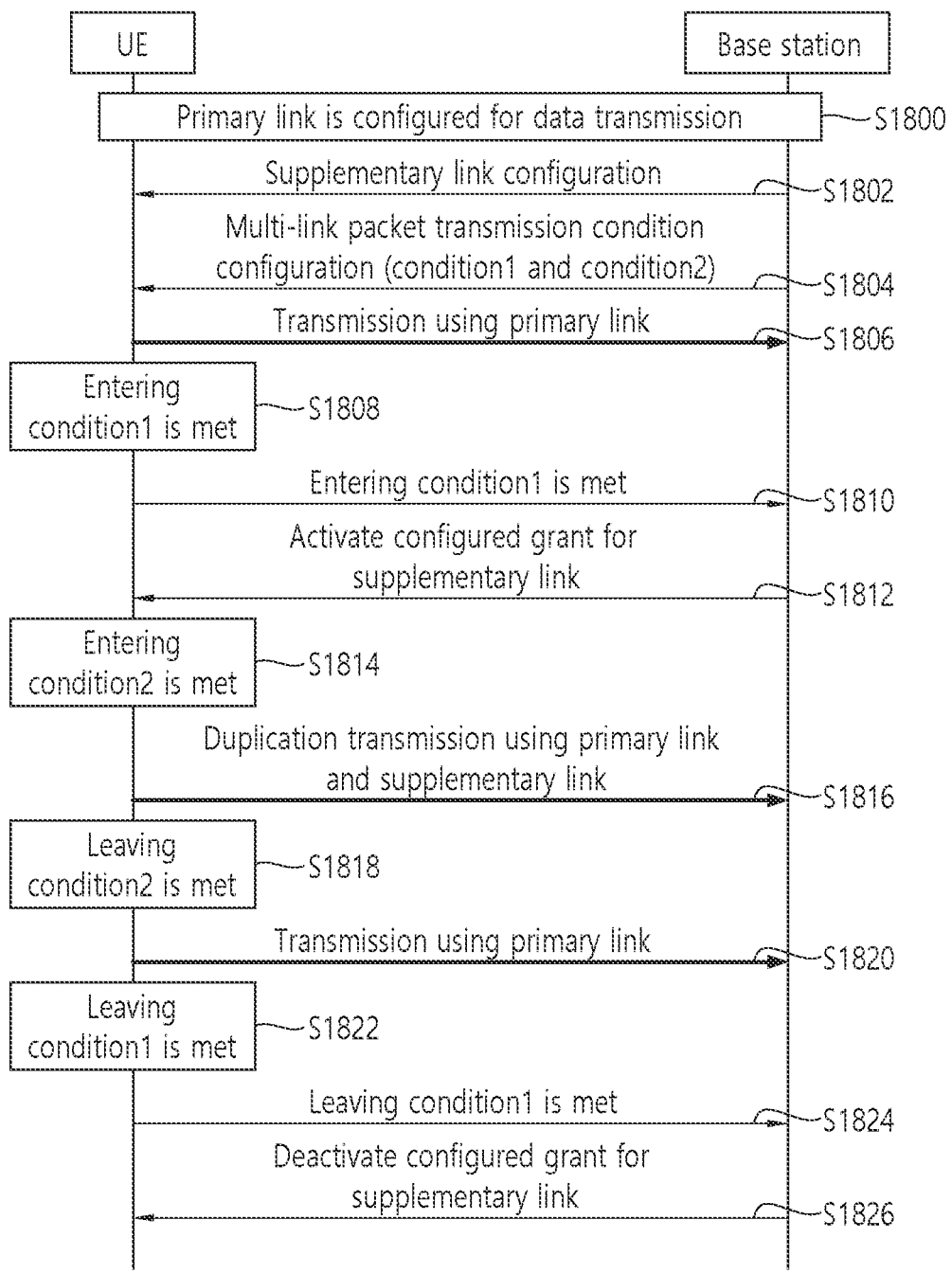
FIG. 18 shows an example of a procedure for conditional duplicate transmission with conditional supplementary transmission link activation to which implementations of the present disclosure is applied.

FIG. 18 shows an example of a procedure for conditional duplicate transmission with conditional supplementary transmission link activation to which implementations of the present disclosure is applied.

In step S1800, the primary transmission link is configured for data transmission. The UE is configured with the primary transmission link for data transmission. Configured grant for the primary transmission link may also be configured. The configured grant for the primary transmission link is activated and allowed to be used.

In step S1802, the UE receives a supplementary transmission link configuration from a base station. The UE is configured with the supplementary transmission link for data transmission. Configured grant for the supplementary transmission link may also be configured. The configured grant for the supplementary transmission link is deactivated and not allowed to be used.

In step S1804, the UE receives a multi-link packet transmission condition configuration from a base station. The multi-link packet transmission condition configuration includes information on Condition 1 and Condition 2.

In step S1806, the UE performs transmission by using the activated configured grant for the primary transmission link.

In step S1808, upon evaluation of the Condition 1, the UE determines that the entering condition of the Condition 1 is met. That is, the UE is under the State 1.

In step S1810, the UE indicates to the network that the entering condition of the Condition 1 is met. The indication of the entering condition of the Condition 1 being met may correspond to request for activation of the configured grant for the supplementary transmission link.

In step S1812, the base station indicates to the UE activation of the configured grant for the supplementary transmission link. Alternatively, even though not shown in FIG. 18, the UE may autonomously activate the configured grant for the supplementary transmission link.

In step S1814, upon evaluation of the Condition 2, the UE determines that the entering condition of the Condition 2 is met. That is, the UE is under the State 2.

In step S1816, the UE performs duplicate transmission by using the activated configured grant for both the primary transmission link and the supplementary transmission link. By the duplicate uplink transmission, the same packet is transmitted over the primary transmission link and the supplementary transmission link.

In step S1818, upon evaluation of the Condition 2, the UE determines that the leaving condition of the Condition 2 is met. That is, the UE is under the State 1.

In step S1820, the UE performs transmission by using the activated configured grant for the primary transmission link.

In step S1822, upon evaluation of the Condition 1, the UE determines that the leaving condition of the Condition 1 is met. That is, the UE is not under the State 1 anymore.

In step S1824, the UE indicates to the network that the leaving condition of the Condition 1 is met. The indication of the leaving condition of the Condition 1 being met may correspond to request for deactivation of the configured grant for the supplementary transmission link.

In step S1826, the base station indicates to the UE deactivation of the configured grant for the supplementary transmission link.

Figure 19:
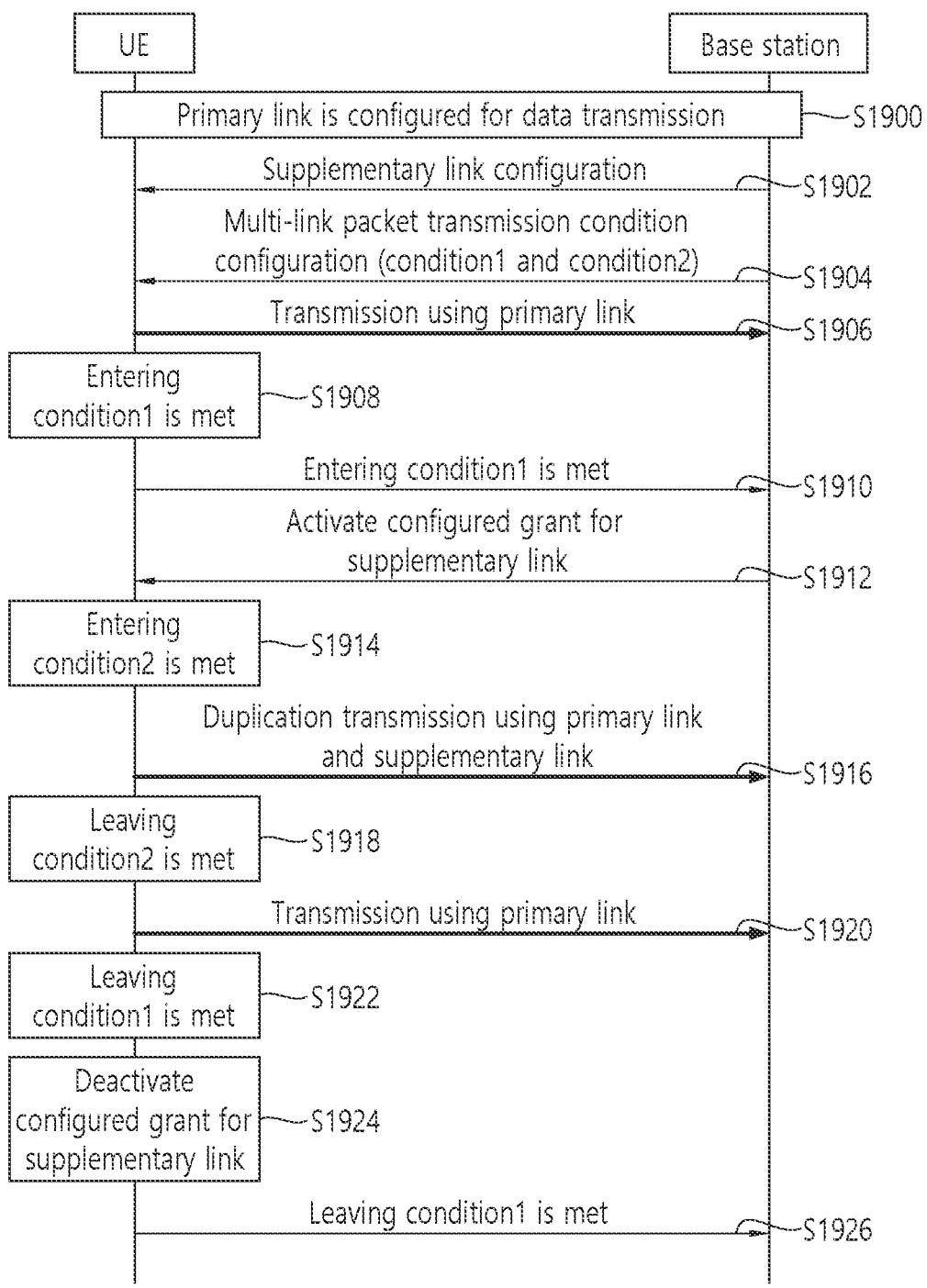
FIG. 19 shows another example of a procedure for conditional duplicate transmission with conditional supplementary transmission link activation to which implementations of the present disclosure is applied.

FIG. 19 shows another example of a procedure for conditional duplicate transmission with conditional supplementary transmission link activation to which implementations of the present disclosure is applied.

Each of steps S1900 to S1922 shown in FIG. 19 corresponds to each of steps S1800 to S1822 shown in FIG. 18.

In step S1924, the UE autonomously deactivates the configured grant for the supplementary transmission link upon that the leaving condition of the Condition 1 is met.

In step S1926, the UE indicates to the network that the leaving condition of the Condition 1 is met. The indication of the leaving condition of the Condition 1 being met may correspond to indication of the deactivation of the configured grant for the supplementary transmission link by the UE autonomously.

Figure 20:
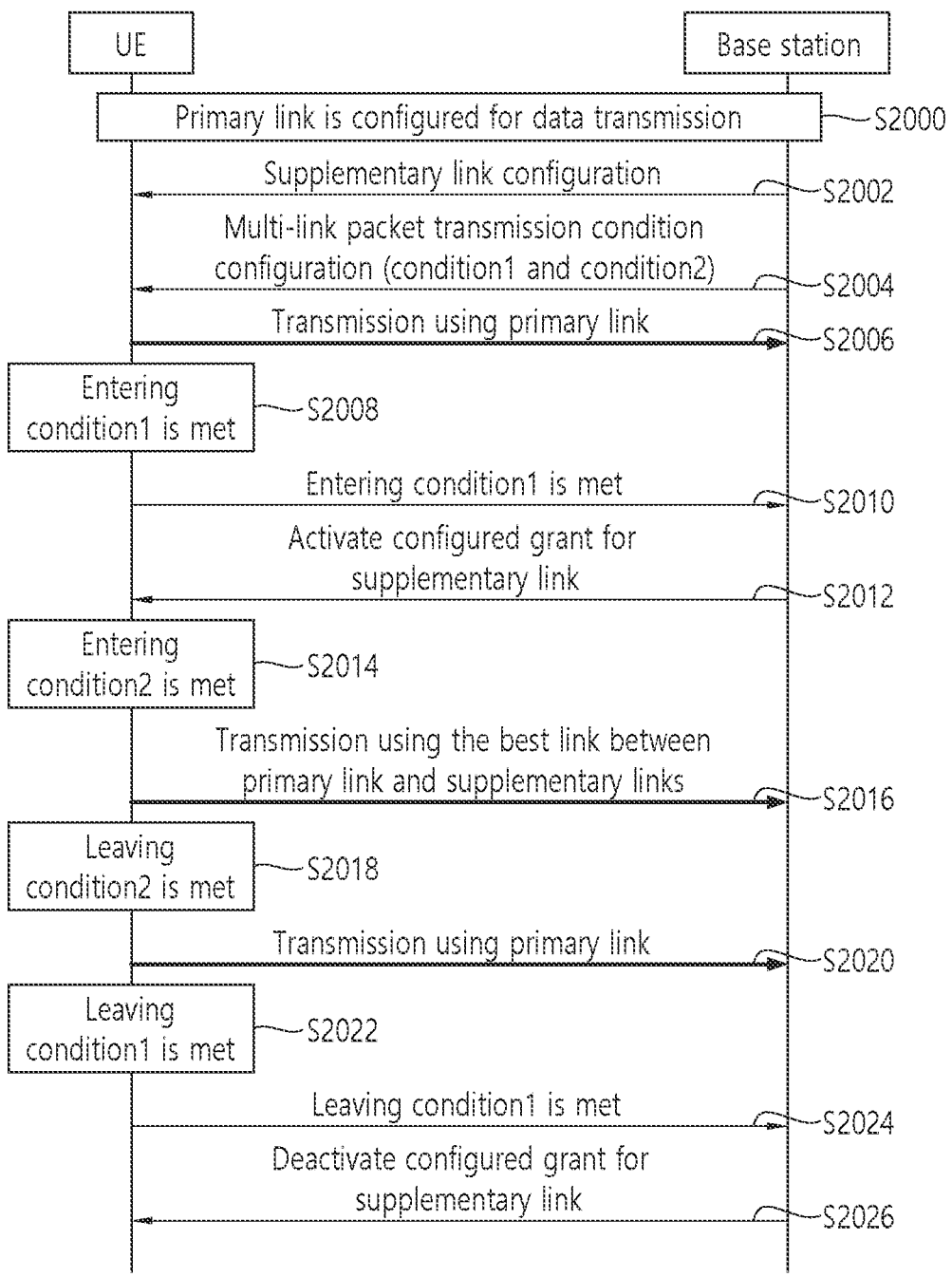
FIG. 20 shows an example of a procedure for conditional selective link transmission with conditional supplementary transmission link activation to which implementations of the present disclosure is applied.

FIG. 20 shows an example of a procedure for conditional selective link transmission with conditional supplementary transmission link activation to which implementations of the present disclosure is applied.

Each of steps S2000 to S2014 shown in FIG. 20 corresponds to each of steps S1800 to S1814 shown in FIG. 18.

In step S2016, the UE performs selective link transmission by using the activated configured grant for the best transmission link between the primary transmission link and the supplementary transmission link. For example, the UE may perform selective link transmission by using the activated configured grant for the supplementary transmission link, since it is highly likely that transmission over the primary transmission link is under severe problem.

Each of steps S2018 to S2026 shown in FIG. 20 corresponds to each of steps S1818 to S1826 shown in FIG. 18.

The present disclosure can have various advantageous effects.

For example, duplicate transmission and/or selective link transmission can be performed conditionally.

For example, only when the UE experiences and/or expects to experience some transmission problem, the supplementary transmission link for duplicate transmission and/or selective link transmission can be activated and/or used.

For example, such conditional duplicate transmission and/or selective link transmission can achieve minimal radio usages and/or minimal transmission delay.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device adapted to operate in a wireless communication system, the method comprising:
   receiving a configuration for a multi-link packet transmission;
   receiving a configuration for a primary transmission link and at least one supplementary transmission link, wherein the primary transmission link is activated;
   receiving a configuration for a configured grant;
   performing a first transmission via the primary transmission link based on the configured grant;
   receiving a configuration for two conditions including a first condition and a second condition;
   determining that the first condition is met upon which the at least one supplementary transmission link is activated; and
   performing a second transmission via at least one of activated transmission links based on whether the second condition is met,
   wherein the wireless device is under a first state based on the first condition being met.

2. The method of claim 1, wherein a potential degradation of transmission performance is experienced and/or is expected to be experienced under the first state.

3. The method of claim 1, wherein the wireless device is under a second state based on the second condition being met.

4. The method of claim 3, wherein an actual degradation of transmission performance is experienced and/or is expected to be experienced under the second state.

5. The method of claim 1, wherein the first condition and the second conditions are conditions related to serving cell quality.

6. The method of claim 1, wherein the first condition and the second conditions are conditions related to transmission delay.

7. The method of claim 1, wherein the first condition and the second conditions are conditions related to queued packet size in transmission buffer.

8. The method of claim 1, wherein the at least one supplementary transmission link is activated by an activation command from a network.

9. The method of claim 1, wherein the at least one supplementary transmission link is activated by the wireless device autonomously.

10. The method of claim 1, wherein the second transmission is performed via the primary transmission link based on the second condition not being met.

11. The method of claim 1, wherein the second transmission is performed via the activated transmission links including the primary transmission link and the at least one supplementary transmission link based on the second condition being met,
   wherein the second transmission is duplicated on the primary transmission link and the at least one supplementary transmission link.

12. The method of claim 1, wherein the second transmission is performed via selected one of the activated transmission links including the primary transmission link and the at least one supplementary transmission link based on the second condition being met.

13. The method of claim 1, wherein the wireless device is in communication with at least one of a mobile device, a network, and/or autonomous vehicles other than the wireless device.

14. A wireless device adapted to operate in a wireless communication system, the wireless device comprising:
- at least one transceiver;
- at least one processor; and
- at least one computer memory operably connectable to the at least one processor and storing instructions that, based on being executed by the at least one processor, perform operations comprising:
- receiving a configuration for a multi-link packet transmission;
- receiving a configuration for a primary transmission link and at least one supplementary transmission link, wherein the primary transmission link is activated;
- receiving a configuration for a configured grant;
- performing a first transmission via the primary transmission link based on the configured grant;
- receiving a configuration for two conditions including a first condition and a second condition;
- determining that the first condition is met upon which the at least one supplementary transmission link is activated; and
- performing a second transmission via at least one of activated transmission links based on whether the second condition is met,
- wherein the wireless device is under a first state based on the first condition being met.

* * * * *